Figure 1:
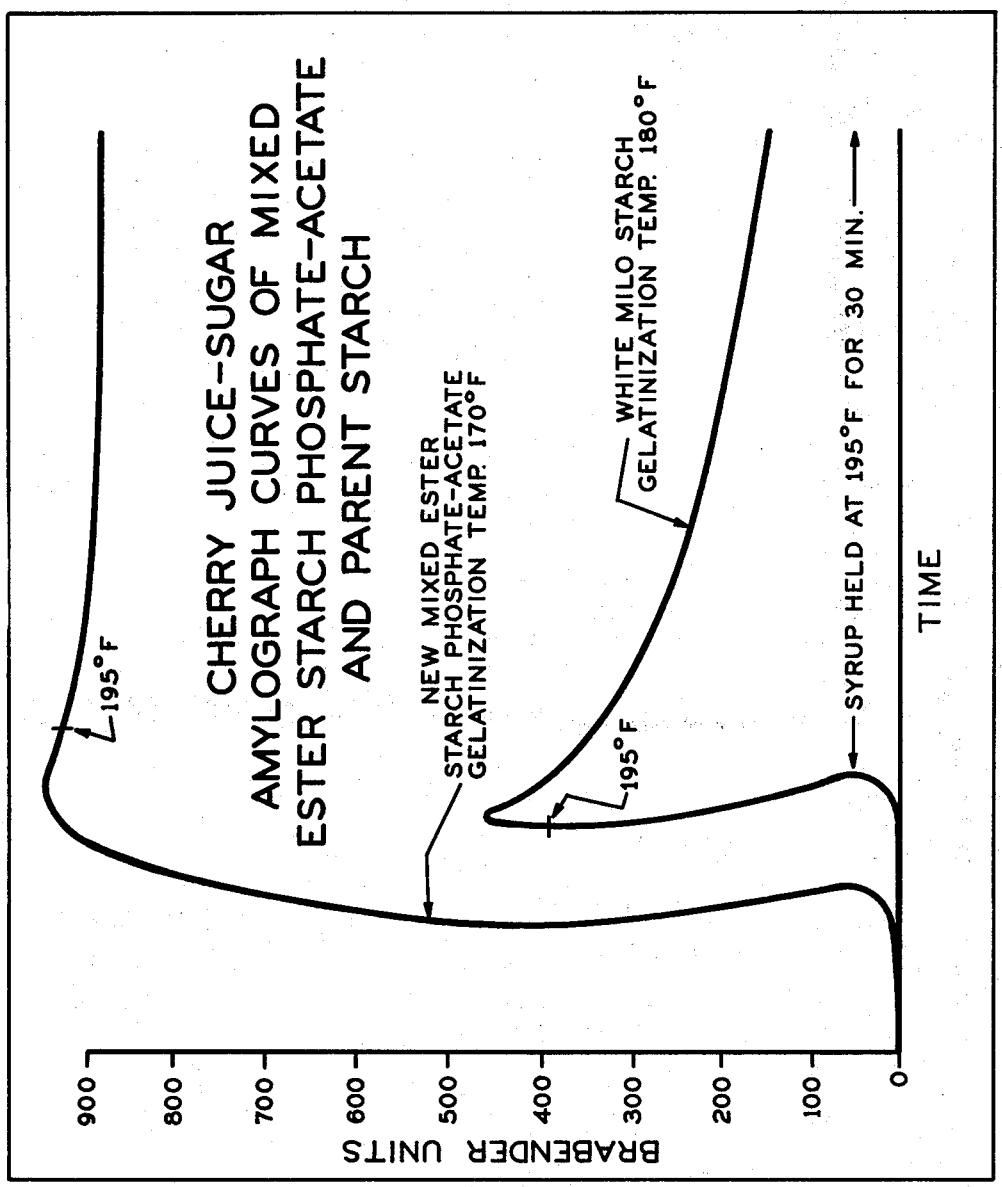

Inventors
RALPH W. KERR
WALTER J. KATZBECK

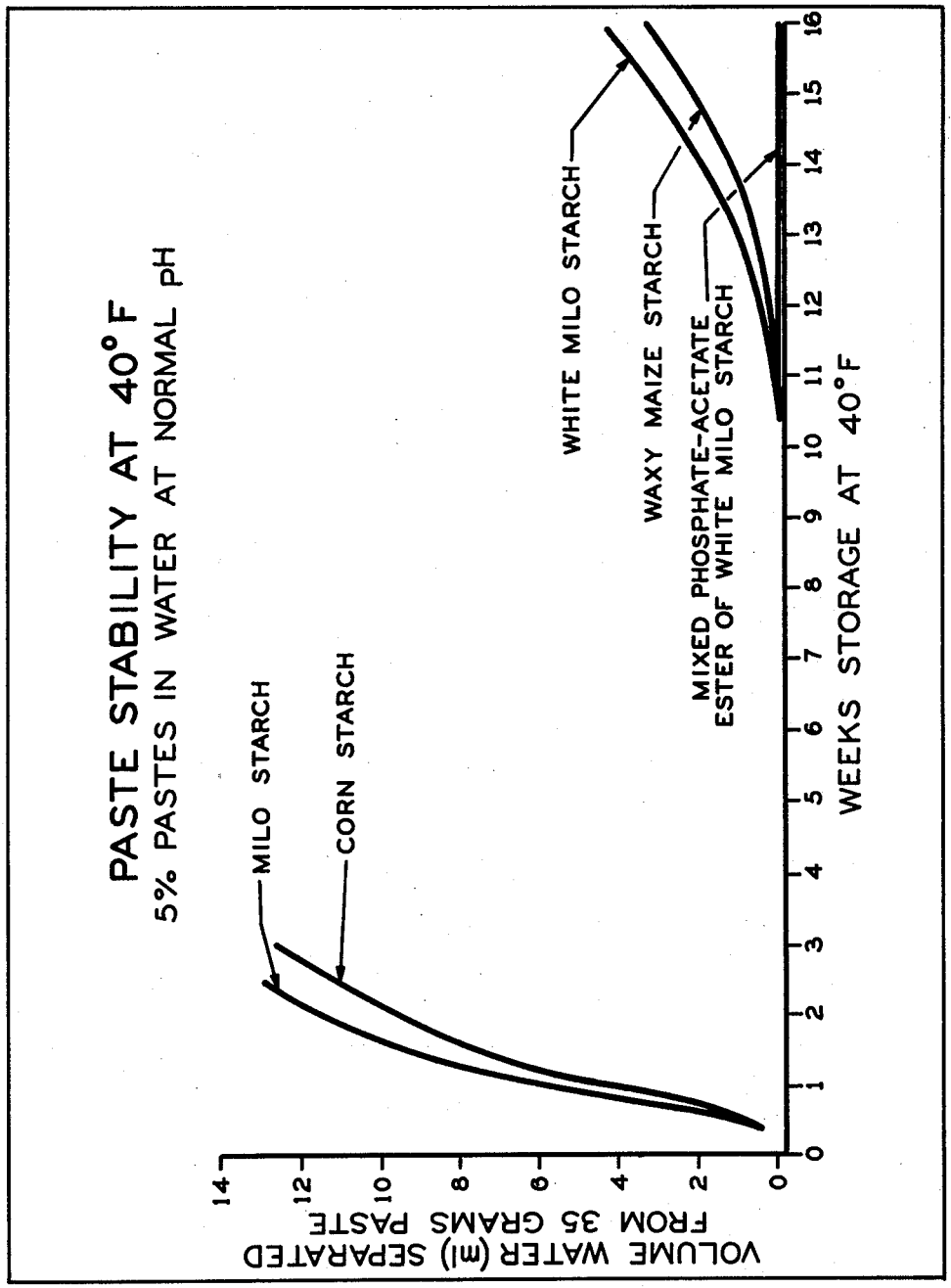

United States Patent Office 3,061,604
Patented Oct. 30, 1962

3,061,604
PROCESS FOR PREPARING A MIXED ESTER OF STARCH
Ralph W. Kerr, Riverside, and Walter J. Katzbeck, Oak Park, Ill., assignors to Corn Products Company, New York, N.Y., a corporation of Delaware
Filed Mar. 29, 1960, Ser. No. 18,324
9 Claims. (Cl. 260—233.5)

This invention relates to new starch derivatives in granule form which have low gelatinization temperatures; pastes made from these derivatives are stable to excessive viscosity breakdown on prolonged heating, particularly in the presence of acid and sugar, or under pressure, and are stable to retrogradation at below normal temperatures and to freezing and thawing.

This invention is primarily concerned with a novel and hitherto unknown, mixed starch ester, in which some of the hydroxyl groups in the starch molecule are esterified with orthophosphate groups and others are esterified with acetate groups. This invention is more particularly concerned with starch mixed esters wherein the D.S. is of a relatively low order (0.2 or less) both in respect to substituent phosphate groups and to substituent acetate groups and wherein the substituent phosphate ester groups are substantially all distarch orthophosphate.

This invention is further concerned with certain uses for these aforementioned mixed esters which utilize their remarkable properties as hereinafter set forth.

Native starches when dispersed in water and heated, form thick pastes which subsequently thin out to a much lesser consistency due to granule rupture. Such starches are not useful in applications where a desired consistency must be maintained during prolonged heating and where subsequent gelation of the starch must be avoided.

It is known from the prior art that starch may be derivatized or otherwise treated with certain inorganic or organic compounds such as, for example, formaldehyde or epichlorohydrin which will diminish granule breakdown. Derivatizing agents are known, the use of which, at normal or below normal temperature conditions, will reduce retrogradation of pastes made therefrom. Some of these treatments will reduce the temperature at which starch gelatinizes. These properties change usually according to the degree to which the starch has been treated and depending upon the type and amounts of the substituent group introduced into the starch molecule.

There are fields of use for which starch pastes exhibiting heat stability would be well suited, but in which they have found limited application because they lack low temperature stability. One of these is the manufacture of canned pie fillings. If an edible starch product were sufficiently stable at low temperature, and also had a low gelatinization temperature, and high paste stability at high temperatures, it could be used to great advantage in this application and a marked economy could be effected.

We have now discovered, in accordance with this invention, that a novel and hitherto unknown mixed starch phosphate-acetate ester, has unexpectedly, all of the desirable features above discussed, combined in one starch product to the highest degree, particularly when the degree of substitution values of the starch ester are within the limits as hereinafter set forth. These desirable characteristics are:

(1) Low gelatinization temperature.
(2) Stability of paste viscosity to heat, pressure, other shearing stresses and acid.
(3) Colloidal paste stability when stored for prolonged periods at 4° C., and less, and
(4) Aqueous paste capable of reconstitution after many repeated freezing and thawing cycles.

The product of our invention may be made by one skilled in the art by using any of several well known methods of the prior art for phosphating starch with distarch orthophosphate groups and for acetylating starch either in an aqueous slurry or under semi-dry conditions, particularly bearing in mind that our preferred product is within certain D.S. ranges both in respect to phosphate and to acetate and that in making one or more of our preferred products, the starch granules are maintained throughout the two esterification reactions in the original unswollen granule state. Although the phosphating and acetylation may be carried out in any order, it is preferable to carry out the phosphating first. It is preferable to carry out the reactions in a slurry but the reactions will take place at very low moisture contents, e.g., as low as 2 percent moisture in the reaction mixture.

However, as indicated above, we have also discovered a novel procedure for making a mixed starch phosphate-acetate. This is by a single stage process wherein all of the above-mentioned objectives are attained.

The new mixed ester derivatives are preferably made by reacting starch with a water soluble, metaphosphate salt, e.g., sodium trimetaphosphate, and acetic anhydride in an aqueous alkaline slurry. The ratio of metaphosphate salt to starch may be varied from about 1 part to about 10 parts by weight per 1000 parts of starch, and the ratio of acetic anhydride to starch may be varied from about 5 to 20 parts by weight per 100 parts of starch depending upon reaction conditions. Reaction temperature may be varied from 70° F., or less, to preferably not above 140° F. Reaction time will vary according to conditions used and can be as short as 15 minutes or less or as long as 24 hours. A reaction time of from about 1 to about 5 hours is preferable.

Reaction between starch and the metaphosphate salt is measured viscometrically (as below indicated) since a small change in the number of distarch phosphate ester groups formed produces a significant change in product viscosity. The actual number of such disubstituted groups in the product is so small in any case that ordinary analytical techniques do not distinguish a significant change in phosphorus level between various products or as the reaction proceeds. Viscosity is measured with a Scott instrument in which a quantity of the product, corrected arbitrarily to a 12 percent moisture basis, is cooked in 280 ml. of water for a specified period of time, and 100-ml. of paste allowed to flow through an orifice.

Reaction betwen starch and acetic anhydride is measured analytically by neutralizing an aliquot of the reaction mixture with hydrochloric acid, followed by filtration and purification with water-washing. The starch cake is dispersed in water in an Erlenmeyer flask and its pH adjusted to pink to phenolphthalein. A known excess of standard NaOH solution is added and the dispersion is agitated for 30 minutes. The amount of alkali remaining is back-titrated to a colorless endpoint with standard acid. After determining a blank value (the parent starch treated in the above manner), the number of acetyl groups in the starch derivative can be calculated. These may be expressed as a percentage of the total weight of product or, preferably, as the average number of acetyl groups per anhydroglucose units of starch (D.S.). Phosphate D.S. was calculated from percent phosphorus, determined by a modification of the method of Kitson and Miller, Analytical Chemistry, vol. 16, page 379 (1944).

In a preferred embodiment of this invention for producing the novel, starch mixed ester, starch in granule form, and in aqueous slurry is treated with both esterifying reagents in a single unit operation. That is to say, both esterifying reagents may be added to the starch slurry at the start of the operation, or the metaphosphate, for example, may be added first, and then in the same unit process, acetic anhydride may be added, even after a portion of the phosphorylating reagent may have reacted. When both esterification reagents have reacted with the starch, the reaction mixture is neutralized by adding an acid, the starch product is filtered, or otherwise dewatered, and washed with water to purify the product from by-products of both reagents, and the purified, mixed ester is dried.

More specifically, this preferred process consists in suspending starch in water, into which has been dissolved sufficient NaOH to catalyze both esterification reactions and, preferably, a salt to repress gelatinization of the starch granules. The salt may be, for example, NaCl or $Na_2SO_4$ and may be advantageously added up to as high as 10 percent or more concentration. Alkalinity sufficient to catalyze both esterifications is represented by a pH value of about 7.5 to about 12. At a temperature below that of the gelatinization range of the starch in this medium, e.g., 60° C., increments of a soluble metaphosphate salt, e.g., sodium trimetaphosphate, and acetic anhydride are added until sufficient amounts of reagents have been thus added so that after reaction, the desired D.S. levels will be attained. Also, with the increments of acetic anhydride added, additional alkali or alkaline material must be added to neutralize any acetic acid liberated from the acetic anhydride which does not react with the starch, so as to preserve the alkaline catalyst for the two esterifications, which is preferably NaOH as above indicated. Alkali or alkaline material added to neutralize any liberated acetic acid may also be NaOH or other suitable reagent, e.g., lime, sodium carbonate and the like.

The D.S. ranges for both acetate and distarch phosphate groups required to produce the hereinafter described unusual properties of our product will be found to vary somewhat with the botanical variety of the starch employed as substrate, that is, whether the starch is, for example, milo, corn, tapioca or waxy maize. However, in general the preferred ranges for acetate D.S. are from about 0.05 to 0.20 and for distarch phosphate, about 0.001 to 0.003. One of our preferred starting starches is known commercially as white milo starch, which is a member of the variety known as waxy grain sorghum starch. For this starch a preferred acetate D.S. range is from about 0.05 to 0.10 and the preferred distarch phosphate range is about 0.001 to 0.002. The D.S. values, both in respect to phosphate and acetate are regulated primarily by the ratio of each reagent, respectively, to starch, and by the total time of reaction.

After the reactions have been allowed to proceed simultaneously until both are substantially completed, the reaction mixture is neutralized by adding an acid such as hydrochloric acid, the starch mixed ester is washed with water, as for example, in hydroclones, dewatered, as for example, by use of centrifuges or on vacuum filters, and the moist cake is dried in conventional type starch dryers.

Alternately, in promoting the acetylation and phosphating reactions simultaneously in the above example, increments of both acetic anhydride and sodium metaphosphate may be added at such rates and in such proportions that the addition of each reagent is actually a continuous flow.

Additional advantageous features of our preferred novel process are:

(1) The respective D.S. levels for acetate and phosphate can readily be controlled and the type of phosphate groups, distarch orthophosphate, obtained so as to yield the product of our invention with its unusual and very useful properties.
(2) The starch may readily be maintained in the unswollen granule state throughout derivatization.
(3) The esterification reagents are relatively inexpensive, the reaction medium is water, only a single catalyst (alkaline material) is used to promote simultaneously both esterifications, the process may be carried out in open tubs and the starch mixed ester may be easily purified by washing with water, dewatered and packed, all in the usual starch handling equipment, all of which leads to an unusually low cost, double esterification in a single procedure.

The starch product of this invention has unanticipated and novel properties, conferred by the proportions of disubstituted phosphate and acetate ester groups in its molecule, as will be described. Specifically, the new product is a cross-linked starch containing disubstituted phosphate ester groups to a degree as measured by reduction in Scott viscosity of pasted starch to a level of from 40 to 80 seconds per 100 ml. delivery when from about 9 to about 12 grams of starch (12 percent moisture basis) are cooked in 280 ml. of water, and also containing from about 5 to 20 acetyl groups per 100 anhydroglucose units of starch. These mixed ester derivatives of starch are readily distinguishable from those which contain alone only either the disubstituted phosphate groups or the monosubstituted acetate groups in that our mixed esters of starch have low gelatinization temperatures, pastes thereof are stable to breakdown on prolonged heating and are colloidally stable at low temperatures of 4° C., or less, for long storage periods and to freezing and thawing.

When the product of our hereinabove described novel process is gelatinized, as by heating in aqueous media, a relatively heavy bodied, viscous product results, indicating substantially no degradation of the starch molecule even after a dual esterification. This remarkable accomplishment gives a starch product of high thickening power which makes it very useful as a thickening agent in foods, as for example, cream sauces, pie fillings and the like. As above indicated, when the novel mixed ester is made by our novel preferred process, it has a relatively low gelatinization temperature, the paste is stable to excessive breakdown on heating and is colloidally stable to prolonged storage at 4° C. or less, including freezing and thawing.

Although we have described our process as applicable to ungelatinized starch, it is also applicable to gelatinized or pasted starch. The choice of process will depend upon the end use of the mixed ester of starch.

The following examples illustrate preparation of the new mixed esters and show the characteristics of the products made.

EXAMPLE 1

To 1 kilogram of white milo starch in a 22° Bé. slurry in a beaker maintained at a temperature of 110° F. was dissolved 20 grams of sodium chloride. Two percent sodium hydroxide solution was added, to adjust the alkalinity of the agitated slurry to pH 10, followed by 6 grams of sodium trimetaphosphate (Victor Chemical Company), dispersed in 50 ml. of warm water. Phosphorylation was followed by periodically removing for analysis, aliquots of the slurry containing 8.8 grams dry substance starch, neutralizing the alkali with dilute acid, followed by filtration and water purification of the sample to remove residual salts. The analytical cake sample was dispersed in sufficient water to make a total volume of 280 ml. and cooked in the Scott apparatus. When the Scott viscosity of a sample of the reaction mixture reached a predetermined value (in about 2 hours' reaction time under the above conditions) acetic anhydride (96 percent technical grade, Merck & Company), was added to the reaction mixture simultaneously with a 4 percent solution of sodium hydroxide at such a rate as to maintain the pH in the range between about 8 and about 9. About a quarter of an hour was required to add 97 grams of anhydride, in this fashion, after which the slurry was agitated for an additional half hour to complete phosphorylation and acetylation reactions. Then the pH was adjusted to 6.5 with dilute hydrochloric acid. The mixed phosphate-acetate ester starch product, in granule form, was filtered, purified by water-washing and dried by conventional means to commercial moisture level. It had the following characteristics:

Color and form _____ White powder, consisting of intact starch granules.
Odor and taste _____ No foreign odor or taste.
pH _____ 5.8.
Moisture content _____ 11 percent.
Scott viscosity _____ 58 seconds per 100 ml., pasting 10 grams in 280 ml. of water.
Degree of substitution ____ 0.1 acetyl groups and 0.002 phosphate groups (base on P analysis of 0.04%) per anhydroglucose unit of starch.
Ash _____ 0.16 percent.
Gelatinization temperature (in water) _____ 70° C.

EXAMPLE 2

The new mixed ester starch derivative, made in Example 1, was used in preparing a cherry pie filling according to a formulation and procedure, as will be described below, which is typical of that used commercially by manufacturers making canned fruit fillings for home consumption.

140.0 grams cherry juice
100.8 grams water
20.2 grams starch phosphate-acetate (Example 1)
20.0 grams corn syrup
52.0 grams cane sugar
272.0 grams drained cherries The starch phosphate-acetate was dispersed in the water and juice and the sugar and syrup added. pH of the suspension was about 3.5, and it was heated until the starch product began to thicken. It was then poured over the cherries in a No. 2 size can which was subsequently sealed. The can was inverted several times while heated in chambers which brought the internal temperature up to about 195° F. About 30 minutes were required for this operation. The can was then cooled and stored at a temperature of about 40° F. for 3 months. At the end of this period, the can was opened and the contents examined. No evidence of starch retrogadation, gelling, or syneresis was found. The syrup was thick, fluid and translucent. Odor and taste of the pie filling were normal. Consensus of expert opinion was that the starch product used in making the filling was acceptable and highly desirable.

EXAMPLE 3

By a modification of the commercial procedure for making a fruit filling as described in Example 2, a laboratory evaluation of the characteristics of the mixed ester, starch phosphate-acetate, was made. The starch product made in Example 1 was dispersed in the liquids as in Example 2, then heated with the sugar and syrup in a regulated manner, with agitation, in the cup of a Brabender amylograph instrument. The point at which the starch began to thicken was indicated on a graph when the pen, tracing the viscosity of the mixture continuously, moved off of its base line. This point was taken as the temperature at which the starch product began to gelatinize and was recorded. Heating was continued until the syrup reached a temperature of 195° F. where it was held for 30 minutes with agitation. Pertinent viscosity information obtained is outlined in Table I below.

The hot syrup was transferred to a beaker. Viscosity measurements were made as the paste was cooled to room temperature using a Brookfield viscosimeter. The beaker was covered, and stored for a period of 6 weeks at a temperature of about 4° C. (40° F.), during which time visual observations and viscosity measurements of the syrup were made periodically. These results are outlined in Table I.

Table I

CHARACTERISTICS OF THE NEW MIXED ESTER STARCH PHOSPHATE-ACETATE IN A CHERRY JUICE-SUGAR FILLING AT pH 3.5 IN COMPARISON TO THOSE OF OTHER STARCHES

| Brabender Amylograph Characteristics | New Mixed Starch Phosphate-Acetate | Underivatized | |
|---|---|---|---|
| | | White Milo Starch | Corn Starch |
| Gelatinization Temperature, °F. | 170 | 180 | 176. |
| Maximum Viscosity, cps. | 1,800 | 460 | 300. |
| Viscosity at 195° F., cps. | 1,800 | 400 | 40. |
| Brookfield Viscosities, cps.: | | | |
| At 170° F. | 8,500 | 800 | 4,000. |
| At 80° F. | 19,600 | 3,150 | 6,800. |
| At 80° F.—24 hours | 21,000 | 4,400 | 22,300. |
| After 3 weeks' storage at 40° F. | 24,400 | 11,000 | Solid Gel with Syneresis. |
| After 6 weeks' storage at 40° F. | 24,200 | 18,000 | |
| Observations during Storage of Syrup at 40° F. for 6 Weeks: | | | |
| Retrogradation or Gelation. | None | Gelled | Badly Gelled. |
| Syneresis | None | Some | Much. |
| Clarity | No change. | Semi-opaque | Very Opaque. |
| Taste and Odor | Normal | Normal | Starchy Taste, Normal. |

FIGURE 1 shows typical Brabender curves obtained when the new mixed ester starch derivative, and the parent starch from which it was made, were pasted in the above manner. The starch derivative began to gelatinize at 170° F. or at a temperature 10 degrees lower than that of the parent starch. The difference in the gelatinization temperature is highly significant since in the commercial method of canning described above in Example 2 in making fruit pie fillings, the application of a minimum amount of heat will partially gelatinize our new starch derivatives. The thickened syrup then helps to suspend and evenly distribute the fruit in the container in the subsequent cooking operation.

Application of the amount of heat which gelatinizes our starch derivatives to a starch product which has a higher gelatinization temperature will not cause granule swelling. The thin syrup made from the underivatized starches, when poured over fruit, does not have the ability to suspend and distribute the fruit evenly and most of it will be found in an unsightly mass at the bottom of the can when the can is opened.

In this and other processes for making fruit pie fillings, heating the fruit mixture to temperatures high enough to sufficiently gelatinize conventional pie filling starches of the prior art, detracts from the appearance, taste and other quality characteristics of the fruit, particularly cherries, strawberries and blueberries.

FIGURE 1 also shows the excessive breakdown which occurs when an underivatized starch is heated at a high temperature for a prolonged period in an acid-sugar medium. Syrup containing such starch is thin and watery. Our new starch phosphate-acetate products, typified by the example shown, are unaffected by prolonged heating and form syrups of a desirable consistency.

Many proposals have been made in the prior art to stabilize the viscosity or thickening power of starch during cooking periods by various esterification or etherification procedures with varying degrees of success, but we have found that although some measure of stability to higher temperatures was obtained, these prior art products, when gelatinized, showed less stability to storage at lower temperatures, e.g., 40° F. or less, than the parent starch from which they were prepared.

We have also found that several types of derivatizations of starch actually reduced the viscosity stability of starch to higher temperatures during cooking, while increasing scarcely at all, the inherent stability (or lack of it) of the pasted starch to deterioration at low storage temperatures.

Accordingly, it was quite unanticipated when we found that our product, a starch phosphate acetate was remarkably viscosity stable both to high cooking temperatures (see FIGURE 1), and to low storage temperatures for the cooked paste. Indeed, pastes of our white milo starch phosphate acetate could be frozen and thawed several times without the slightest degree of deterioration, as will be illustrated, hereinafter, in Example 4.

When aqueous starch pastes are allowed to age they will retrograde at a rate dependent upon the type of starch used, its concentration and the pH of the system. Retrogradation is the reassociation of starch molecules in the paste to a more insoluble form. During reassociation, the paste begins to gel and releases some of the water it has taken up during the cooking process. Freezing and thawing of a starch paste or aging it at below normal temperatures accelerates retrogradation and the subsequent separation of water from the starch paste. Determining the amount and rate of water separation from a starch paste during a series of freeze-thaw cycles or when aged, over a period of weeks, at below normal temperature is an indication of the stability of the starch in the paste.

The following procedure is that used for evaluation of the freeze-thaw and below normal temperature stability of an aqueous starch paste whose starch concentration is 5 percent by weight.

*Determination of low temperature and freeze-thaw stability of starch pastes.*—A Scott beaker and paddle are weighed together. To the beaker is added 20.4 grams of starch (dry basis). Distilled water or alternately 37° Brix sugar solution is added to the starch until the total weight (minus the beaker and paddle) equals 408 grams. A small amount of a preservative is added to protect against bacterial action. If the evaluation is to be made under acid conditions, the pH of the slurry is adjusted to the desired level by the addition of 1 N citric acid solution. The slurry is cooked in a steam-heated water bath known as a Scott bath. The cooking procedure is the same as that used in the preparation of a starch paste for a Scott viscosity determination (reference R. W. Kerr, Chem. & Ind. of Starch first edition, pp. 86–87). The Scott beaker is placed in the vigorously boiling water of the Scott bath and stirred mechanically at 200 r.p.m. for exactly 5 minutes. Thereafter, the stirring is stopped, and the beaker containing the starch, which is now in the form of a paste, is covered and allowed to remain in the boiling water for an additional 5 minutes. The paste is then stirred by hand for 10 seconds and allowed to stand, covered, in the bath for 2 minutes and 45 seconds. The paste is again stirred by hand for 15 seconds. It is finally allowed to stand in the bath an additional 1¾ minutes after which the beaker of paste is removed from the bath.

Immediately, the beaker of paste with its paddle is brought back to its original weight by the addition of boiling water to compensate for water lost by evaporation. The added water is quickly stirred into the paste by hand, and the beaker covered with rubber sheeting. It is allowed to stand 1.5 hours at room temperature while the paste cools to about 125° F. Thirty-five gram portions of the paste are transferred by weighing into each of 10 glass, 50 ml., graduated centrifuge tubes. The tubes are stoppered and allowed to equilibrate for 1.5 hours in an 86° F. water bath.

A freeze-thaw cycle is carried out over a period of 24 hours. The tubes of paste are placed in a −8° C. glycerol-water bath and the pastes allowed to freeze. After 21 hours at −8° C. all of the tubes of frozen pastes are removed and stored for 2 hours in an 86° F. water bath. The water released from the paste during this freeze-thaw cycle is determined by centrifuging a pair of the tubes for 30 minutes at 2500 r.p.m. After centrifuging, the volume of water separated is read directly in milliliters from the graduations of the tube. The remainder of the tubes of paste are then replaced in the −8° C. bath and the cycle repeated. The 24-hour cycles of freezing and thawing are repeated until the starch paste shows no further change.

The milliliters of water separated from 35 grams of paste is plotted against the number of freeze-thaw cycles. Those starch pastes liberating the most water in the least number of freeze-thaw cycles have the poorest freeze-thaw stability.

A below normal temperature stability evaluation is carried out for 7 day periods. The tubes of paste are placed in a 40° F. water bath. After 7 days at 40° F. the tubes are removed and allowed to equilibrate in an 86° F. water bath. The amount of water separated by centrifuging a pair of tubes is determined as above. The remainder of the tubes of paste are then replaced in the 40° F. bath and the cycle repeated for another 7 days. The milliliters of water separated from 35 grams of paste is plotted against the number of weeks of storage at 40° F. Those pastes liberating the most water in the least number of weeks have the poorest below normal temperature stability.

Figure 2:
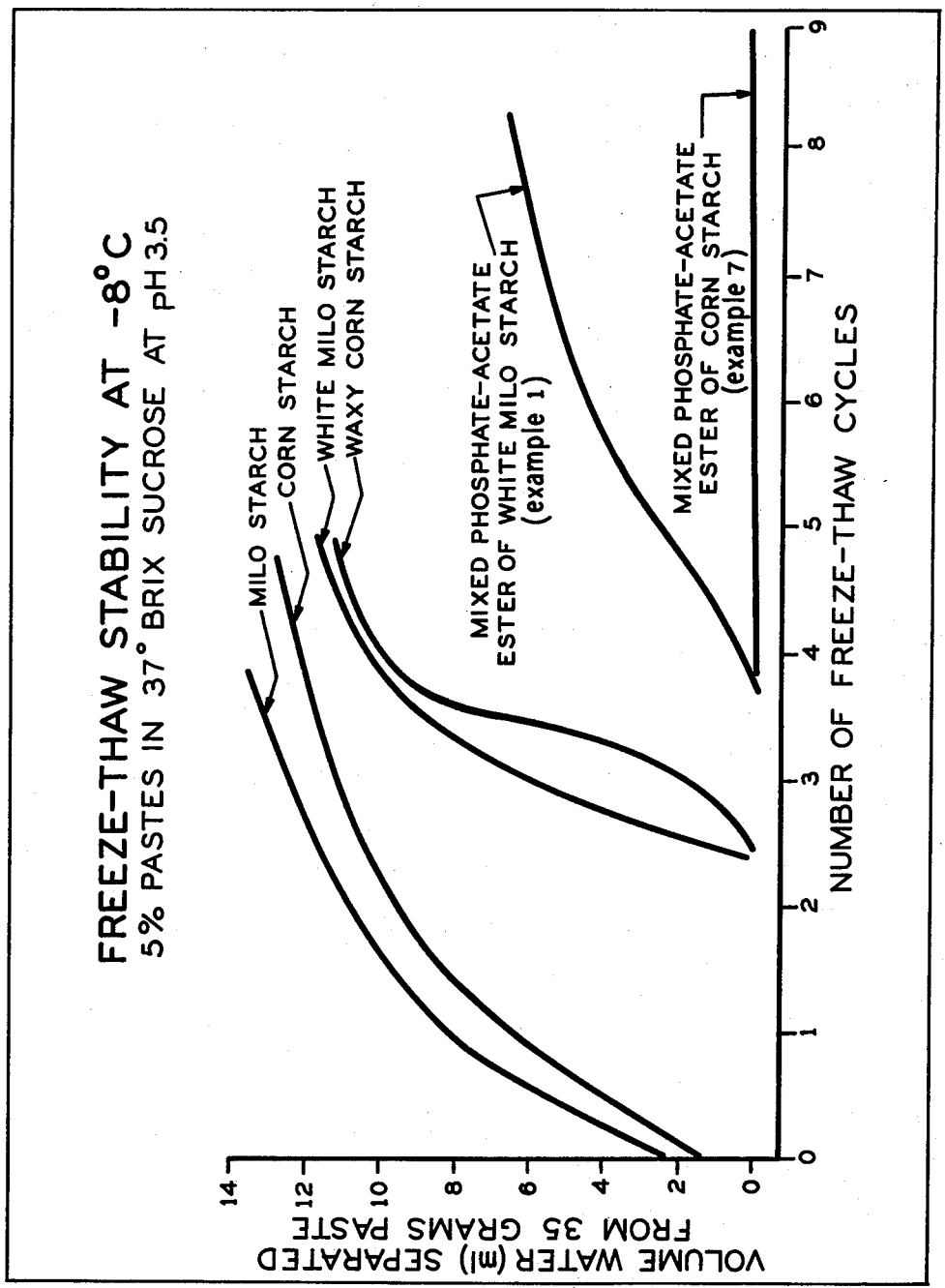
Figure 3:
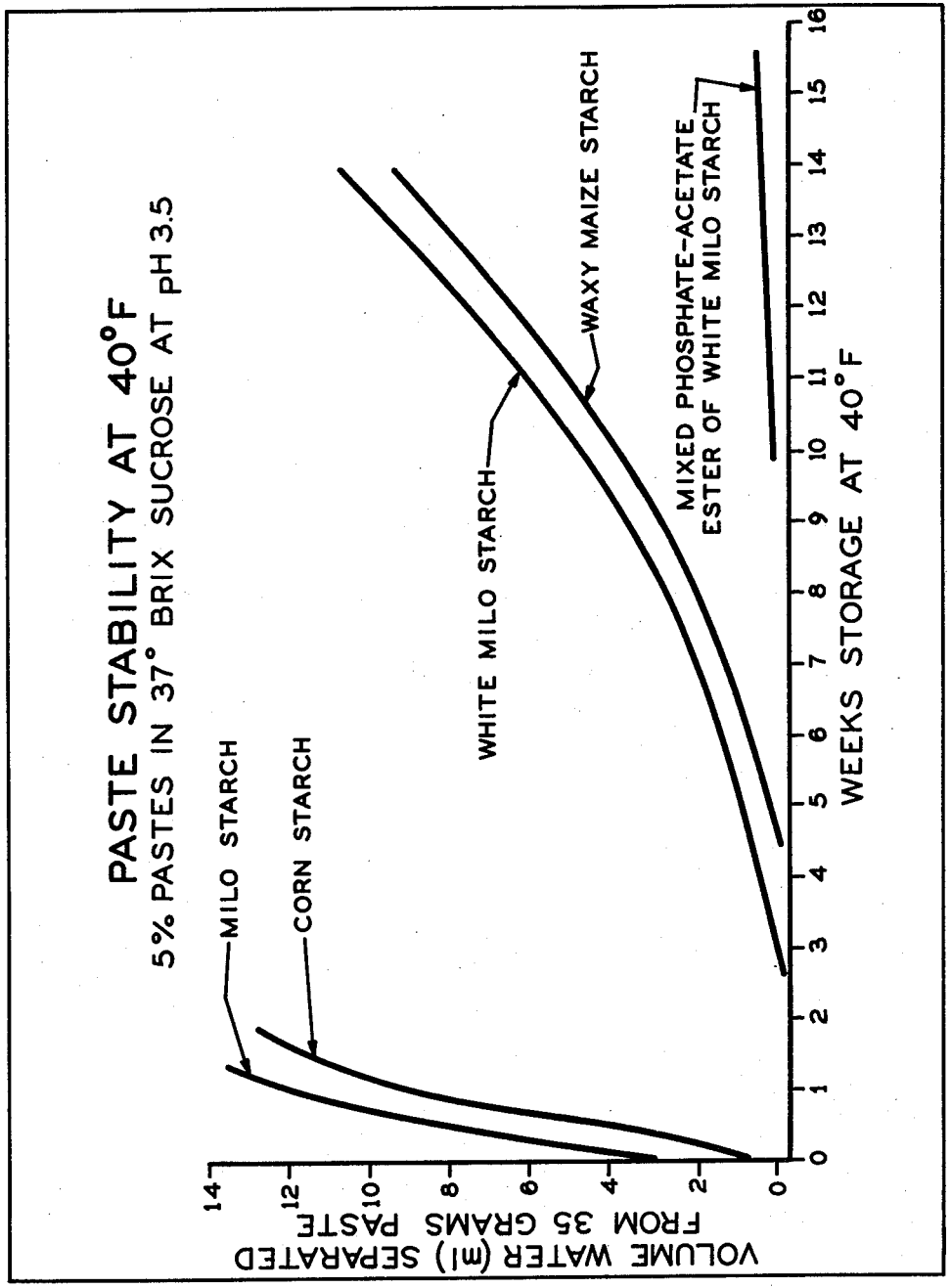

Reference to FIGURE 2 shows the results for one of our starch phosphate-acetate mixed esters, made from white milo starch by procedures essentially as outlined in Example 1 (which showed exceptionally good thickening power and heat stability when cooked at high temperature in making a cherry pie filling (FIGURE 1)), when made into a 5 percent paste in 37° Brix sucrose solution at pH 3.5. These results show that when the paste was frozen for 21 hours at −8° C. and thawed, the paste was completely colloidally stable even after 4 freezing and thawing cycles. Results in FIGURE 3 show that the paste was stable for at least 9 weeks at a storage temperature of 40° F. A similar paste made from underivatized white milo starch, which formed a watery thin filling when used as the thickening agent in making a filling (FIGURE 1), deteriorated after the second freezing and thawing cycle (FIGURE 2) and after only 2 weeks of storage at 40° F. (FIGURE 3). Results are also given for comparison in FIGURES 2 and 3, on similarly prepared pastes in fruit-acid sugar solutions for other untreated starches—corn, milo, and waxy maize starches—commonly used in prior art practice in making pie fillings.

EXAMPLE 4

FIGURE 4 shows the effect of below normal temperature storage on 5 percent pastes of various starch products in water at more neutral pH levels of 5 to 6. A paste made from our new mixed phosphate-acetate ester derivative, made by procedures essentially as given in Example 1, showed no signs of instability even after 16 weeks of storage under these conditions. Pastes made from the waxy varieties of corn and grain sorghum starch remained stable for about 11 weeks, whereas those made from ordinary corn and grain sorghum (milo) starch became unstable within several days.

EXAMPLE 5

A white milo starch mixed ester phosphate-acetate was made, according to an alternate procedure to the one given in Example 1 and using the same amounts, by dissolving the sodium trimetaphosphate in about 100 ml. of water, adding this solution simultaneously with acetic anhydride, both streams running continuously, to the agitated starch slurry maintained at a pH of from about 10 to about 11 by the addition of 4 percent NaOH solution. About two hours were required to add the reagents; then the slurry was additionally agitated for about 30 minutes. Neutralization and purification of the starch phosphate-acetate, mixed ester product was accomplished as was done in Example 1. The product had a Scott viscosity of 45 seconds when 9 grams was pasted in 280 ml. of water.

EXAMPLE 6

Example 1 was repeated with the exception that instead of adding 6 grams of sodium trimetaphosphate, 6 grams of the water soluble portion (dry basis) of commercial sodium metaphosphate was added.

A starch mixed ester identical to the product made in Example 1 was obtained.

EXAMPLE 7

A phosphate-acetate mixed ester was made from corn starch as follows. A 7 liter slurry was made containing 2.9 kg. of corn starch (dry basis), 55 grams of sodium chloride, 16 grams of sodium trimetaphosphate and 7 grams sodium hydroxide. It was agitated at a temperature of 125° F. and at a pH of about 10. After about 50 minutes, 525 grams of acetic anhydride was added to the reaction mixture over a period of about 15 minutes, simultaneously with a solution of NaOH sufficient to maintain the pH level at about 8 to 9. The slurry was additionally agitated at 125° F. to complete both esterifications, then neutralized, and the corn starch phosphate-acetate, mixed ester was purified and dried. The product had a Scott viscosity of 65 seconds when 11 grams was pasted in 280 ml. of water, and a gelatinization temperature of 68° C. The acetyl content by analysis was D.S. =0.18. The phosphate content was D.S.=0.003, based on phosphorus analysis. This mixed phosphate-acetate ester of corn starch made a thick, fluid, translucent cherry pie filling which remained stable upon storage for 6 weeks at a low temperature of about 40° F., when used and tested by the procedures hereinabove given. As shown in FIGURE 2, pastes made from this starch in our standard sugar-acid medium were completely stable even after 9 freeze-thaw cycles.

There are two major disadvantages to the use of starch thickening agents of the prior art, both of which have not heretofore been overcome. These are, first, that the starch paste loses its body or thickening power on use, as for example, during the cooking of a pie filling or a creamed soup (see FIGURE 1), resulting in a thin-running pie filling or a watery cream soup, and secondly, the gelatinized starch in the prepared product deteriorates if the cooked product is stored at lower temperatures, e.g., 40° F. and less, before use and particularly if the prepared product is frozen and thawed (see FIGURES 2 and 3): the starch ingredient deteriorates into an insoluble flocculant or waddy mass and eventually loses its original, desirable colloidal properties.

To overcome the undesirable thinning of most native starches when cooked in water, these can be treated or derivatized with certain compounds which form a bridge or cross link between starch molecules, thus preventing extensive granule rupture. These starch products are said to be crossbonded starches, and they are stable to excessive breakdown on prolonged cooking. However, their gelatinization temperatures are usually the same, or higher than those of the parent starches from which they were made.

Derivatizations which do not form a cross link between starch molecules will, in some cases, lower the temperature at which the starch derivative will cook in water. Some of these derivatizations can increase the stability of the starch to retrogradation at low temperatures. However, such products are not any more heat stable than the parent starches.

The new mixed ester starch derivative described is novel in that it combines in one product all of the highly desirable characteristics for a food thickening starch set forth hereinabove without any disadvantages. It can even be stated more broadly that of all starch derivatives tested or reported, the starch phosphate-acetate of this invention is the only derivative that has all three characteristics in one product: viscosity stability to heat, particularly with acids and under pressure, paste stability at lower storage temperatures over long periods of time and a significantly lower gelatinization temperature than the parent starch. This is unanticipated when the properties of a distarch phosphate and a starch acetate, separately, are considered. Unusual also is the unanticipated discovery that two different forms of derivatization, phosphorylation and acetylation of the starch molecule can occur simultaneously to produce the novel product. Thus, phosphorylation, producing stable cross links between the starch molecules, does not interfere with the acetylation reaction, as might have been anticipated from fundamental considerations of the cross-linking of high polymers. Unusual is our discovery, that by proper selection of a particular phosphorylation procedure and acetylation, both reactions may be carried out together in the same unit process, which employs aqueous media.

We claim:

1. Process for making a mixed ester of starch containing both phosphate and acetate groups wherein the D.S. for the acetate groups is 0.05 to 0.20 and the D.S. for phosphate groups is 0.001 to 0.003, and wherein the phosphate groups esterified with the starch are distarch phosphate, which comprises phosphating and acetylating, in any order, starch, in contact with an alkaline catalyst, the pH during the reaction being from about 7.5 to about 12, the reagent used for the phosphating reaction being a water soluble salt from the group consisting of metaphosphates and polymetaphosphates.

2. The process according to claim 1 wherein phosphating and acetylation are carried out simultaneously.

3. The process according to claim 1 wherein phosphating and acetylating are carried out in a single unit process.

4. The process according to claim 1 wherein phosphating and acetylating are carried out in an aqueous slurry in a single unit process.

5. Process according to claim 1 wherein the phosphating and acetylating agents are added intermittently and alternately.

6. Process according to claim 1 wherein the phosphating and acetylating are carried out in aqueous media.

7. Process according to claim 1 wherein the esterification reactions are carried out without gelatinizing the starch.

8. Process according to claim 1 wherein the phosphating agent is a soluble metaphosphate salt and the ratio of said salt to starch is 1 part to 10 parts by weight per 1000 parts of starch, and the acetylating agent is acetic anhydride, and the ratio of acetic anhydride to starch is from about 5 to 20 parts by weight per 100 parts of starch.

9. Process according to claim 8 wherein the reaction is carried out without gelatinizing the starch.

References Cited in the file of this patent

UNITED STATES PATENTS

| | | |
|---|---|---|
| 1,959,590 | Lorand | May 22, 1934 |
| 2,461,139 | Caldwell | Feb. 8, 1949 |
| 2,607,692 | Kennedy et al. | Aug. 19, 1952 |
| 2,829,978 | Castagna et al. | Apr. 8, 1958 |
| 2,852,393 | Kerr et al. | Sept. 16, 1958 |
| 2,891,947 | Paschall et al. | June 23, 1959 |